US007429910B2

(12) United States Patent
Domenz et al.

(10) Patent No.: US 7,429,910 B2
(45) Date of Patent: Sep. 30, 2008

(54) SECURITY CODE LEARNING METHOD AND APPARATUS

(75) Inventors: Meryldine Domenz, Schaumburg, IL (US); James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 732 days.

(21) Appl. No.: 10/379,875

(22) Filed: Mar. 5, 2003

(65) Prior Publication Data

US 2004/0177279 A1 Sep. 9, 2004

(51) Int. Cl.
*H04Q 7/00* (2006.01)

(52) U.S. Cl. .................... 340/5.23; 340/5.24; 340/5.64; 340/5.71; 340/825.69

(58) Field of Classification Search ................ 340/5.22, 340/5.23, 5.24, 5.71, 825.22, 825.69, 5.64, 340/825.72
See application file for complete search history.

(56) References Cited

U.S. PATENT DOCUMENTS 4,750,118 A * 6/1988 Heitschel et al. .............. 700/90
4,881,148 A * 11/1989 Lambropoulos et al. .... 361/172
5,781,143 A * 7/1998 Rossin ........................ 341/173
5,864,297 A * 1/1999 Sollestre et al. ............ 340/5.23
5,940,007 A * 8/1999 Brinkmeyer et al. ... 340/825.69
6,081,203 A * 6/2000 Fitzgibbon ............. 340/825.72
6,310,537 B1 * 10/2001 Bachhuber et al. .......... 340/5.23
6,856,237 B1 * 2/2005 Richmond et al. .......... 340/5.23
6,963,267 B2 * 11/2005 Murray ........................ 340/5.7
2003/0016139 A1 1/2003 Teich
2003/0234719 A1 12/2003 Denison et al.
2004/0061591 A1 * 4/2004 Teich ........................ 340/5.24

FOREIGN PATENT DOCUMENTS

GB 2 278 701 A 12/1994
WO WO 03/069574 A1 8/2003

OTHER PUBLICATIONS

British Search Report for British Patent Application No. GB0405021.7 dated Jun. 22, 2004.

* cited by examiner

*Primary Examiner*—Edwin C Holloway, III
(74) *Attorney, Agent, or Firm*—Fitch, Even, Tabin & Flannery

(57) ABSTRACT

A barrier movement operator is disclosed which learns wirelessly transmitted access codes during a learn mode and subsequently in an operate mode receives wireless transmissions and determines whether action should be taken by consulting the learned access codes. Methods and apparatus are included which can be used to prohibit the learning of unauthorized access codes.

33 Claims, 3 Drawing Sheets

SECURITY CODE LEARNING METHOD AND APPARATUS

FIELD OF THE INVENTION

The present invention relates to code responsive barrier movement operators and more particularly to code learning methods and apparatus for such systems.

BACKGROUND

Barrier movement operators are known in the art which respond to access or security codes wirelessly transmitted from hand held or mounted transmitters by controlling the position of a barrier. One common example of such a barrier movement operator is the ubiquitous automatic garage door operator, however other barrier movement operators for controlling doors, shutters, windows and gates are also known.

Some barrier movement operators store representations of one or more authorized access codes which are compared to received access codes to determine whether permission is to be given to control the barrier. During the early days of security code responsive operators, switches were set in both the transmitter and a receiver of the operator to identify the code to be transmitted and the operator code to which the received codes were compared. Product evolution has provided an advantage whereby security codes are learned at the operator by placing the operator in a learn mode and wirelessly transmitting a security code to be learned. The operator, entered the learning mode at the press of a pushbutton and while in the learning mode, received the transmitted security codes and stored them in memory. Such a learning mode was initiated by manually pressing a learn button on a part of the operator and/or by transmitting a predetermined signal from a transmitter already learned by the operator. The learning mode then terminated for example, a predetermined period of time after its initiation. The learning mode would be entered each time the appropriate pushbutton was pressed. When not in the learning mode the operator is in an operate mode in which received wireless access codes activate the operator if they bear a known relationship to codes already learned by the operator.

The use of an automatic learn mode to learn wirelessly transmitted access codes has simplified the use of barrier operators. Since the simplification of learning access codes there has remained a possibility that an unauthorized individual could press the learn button, cause the operator to enter the learn mode and transmit an unauthorized code to the operator where it was learned. Later, the unauthorized individual could return and transmit the unauthorized code to the operator which would respond by controlling the barrier. A need exists for a method and arrangement of controlling a barrier operator which retains the ease of security code learning and which provides resistance to the learning of unauthorized codes.

SUMMARY

This need is met and a technical advance is achieved in accordance with the barrier movement operator methods and apparatus described and claimed herein. The barrier movement operator includes the capability of responding to a learn mode signal by learning access codes which later can be used to control the movement of the barrier. In addition, the operator detects the occurrence of a predetermined event and responds thereto by prohibiting further learn mode operations. In this way, prior to the predetermined event easy code learning is achieved, but is prohibited after the event. Such a predetermined event may be the storage of a number of security codes initially set by a user or by the manufacturer of the operator. Alternatively, the predetermined event might be the receipt of a signal from the throwing (pressing) of a switch or the receipt of a particular wireless signal. While in the prohibiting learning mode, no further access codes will be learned by the apparatus. Such protects from unauthorized users teaching their codes to the operator. The operator may include an overriding of the learning prohibition which can be closely controlled by the individuals in control of the barrier movement operator. In one embodiment, the operator includes a key switch which can only be thrown by a person in control who is in possession of a physical key. New codes are entered into an operator in the learning prohibition mode by throwing the keyed switch-which again permits use of the learn mode until the prohibition is again activated. The learning prohibition signal may be originated from a particular master transmitter which the owner keeps secure or which only the manufacturer or distributor of the barrier movement operator can use.

DESCRIPTION

Figure 1:
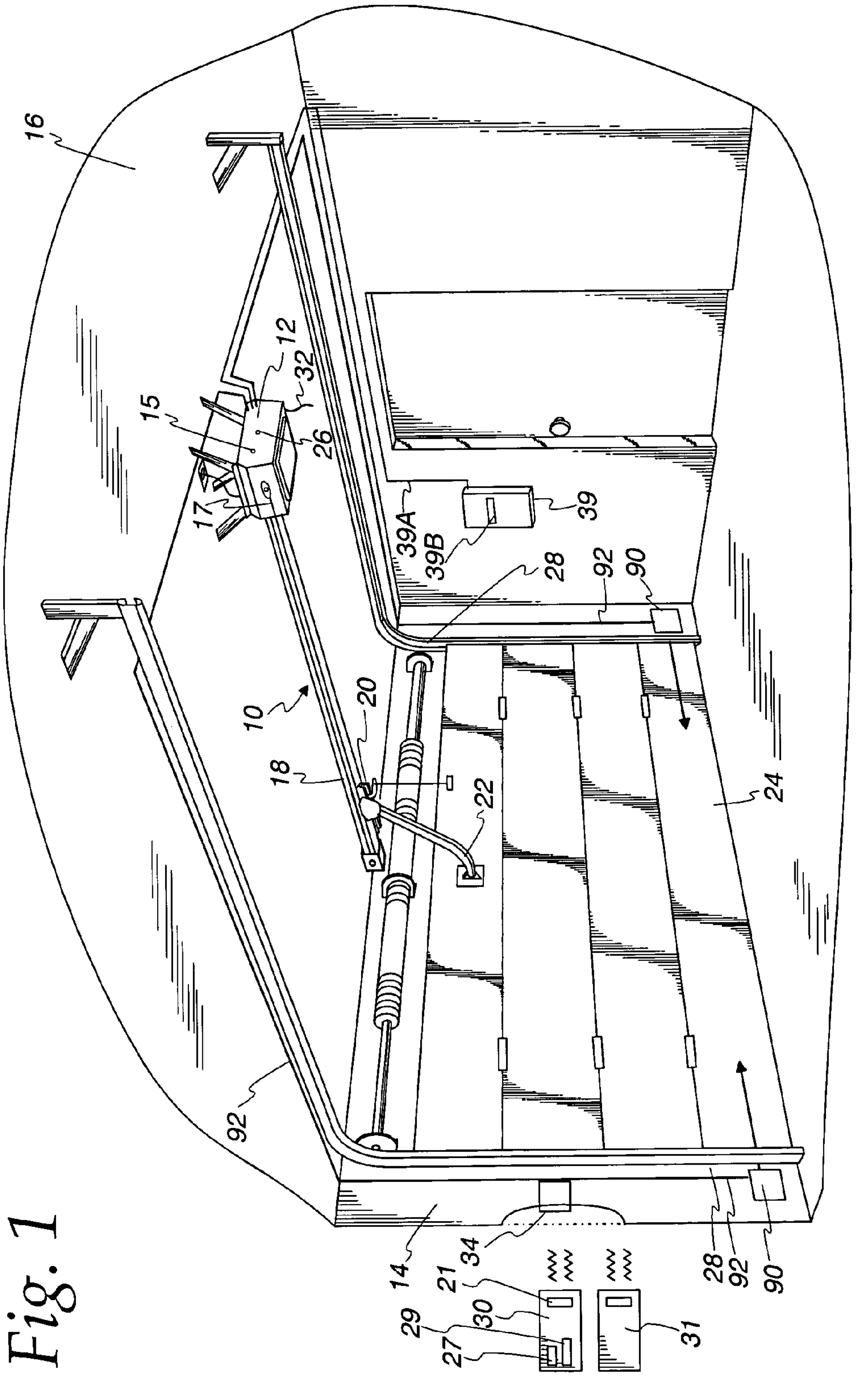
FIG. 1 is a block diagram of a garage interior having an installed garage door opener.

FIG. 1 illustrates a barrier movement operator 10 implemented as a garage door operator. It is to be understood that barrier movement operators for other types of barriers and other types of access code responsive systems are within the scope of the present invention. Barrier movement operator 10 includes a head end 12 mounted from the ceiling 16 of a garage 14. The head end 12 includes an electric motor 106 and a controller 83 for controlling the operation of the motor. A trolley rail 18 extends between the head end 12 and the garage front wall and conveys a trolley 20. A chain connects the trolley 20 to the motor 106 to move the trolley back and forth along rail 18. Trolley 20 is connected to a multi panel door 24 by a member 22 and as the trolley 20 moves back and forth the door 24 is raised and lowered on a pair of tracks 28. A wall control unit 39 is connected to the controller 83 of head end 12 so that when a button 39B is pressed a command to move or stop the door is given to the controller. Controller 83 also receives commands transmitted from two hand held transmitters 30 ad 31 and from an externally wall mounted transmitted 34.

Figure 2:
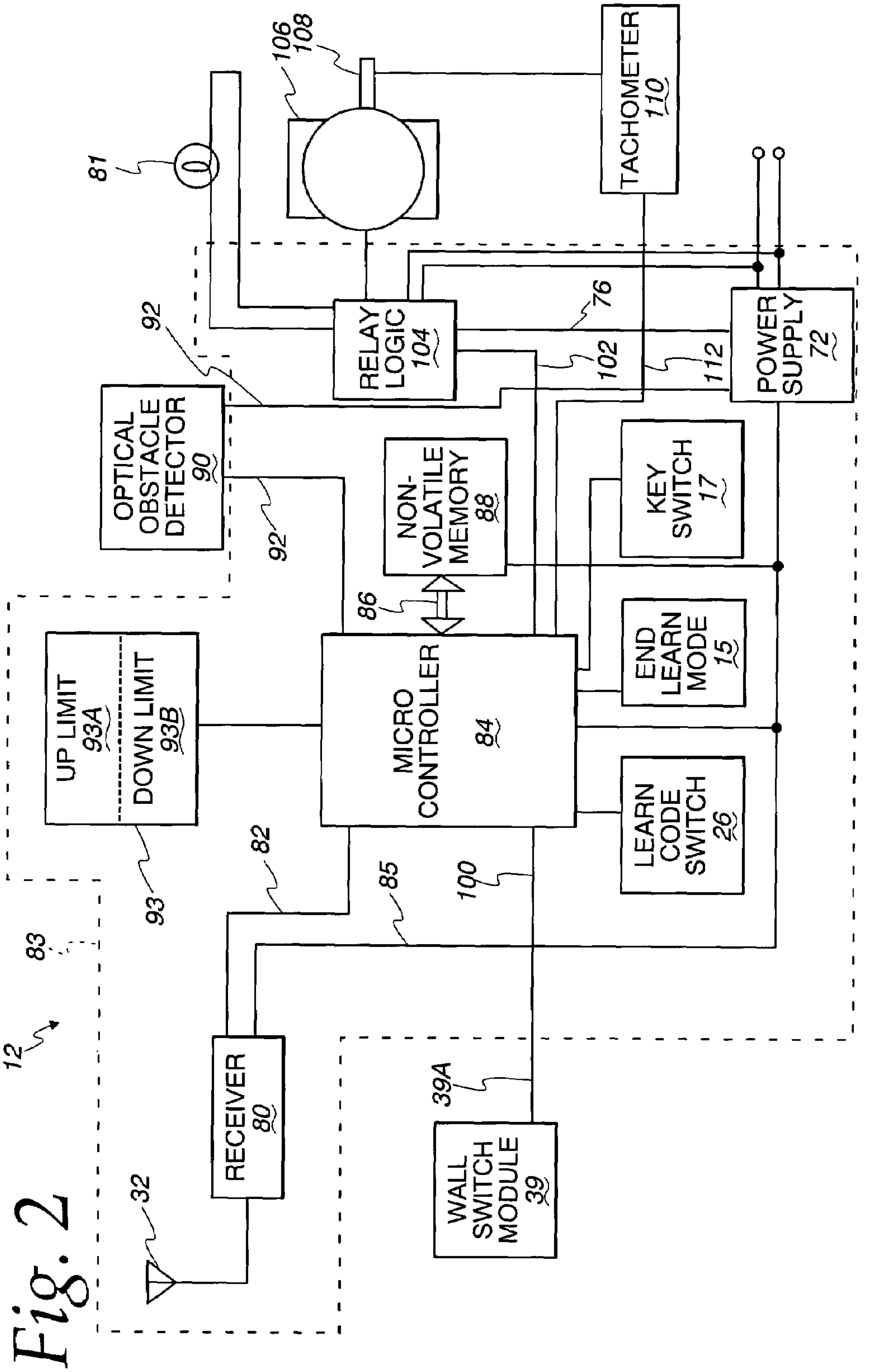
FIG. 2 is a block diagram of a head end portion of the garage door opener.

FIG. 2 is a block diagram of head end 12 and the connections between controller 83 and external signal sources. Controller 83 includes a micro-controller 84 which includes memory to store the program and data to implement control of door movement. Micro-controller 84 is connected to additional non-volatile memory 88 which is used to store operational data such as the access codes learned by the barrier movement operator in a manner discussed below. Head end 12 includes an up limit and a down limit detector 93 which are used by the controller 83 to stop the door when open and closed. An optical transmitter and receiver pair 90 are connected to the controller 83 to indicate when an obstruction is present in the doorway. In the present embodiment transmitters 30, 31 and 34 transmit using rf which is received by a receiver 80 via an antenna 32. The receiver 80 sends the results of signal detection to the micro-controller 84 via a path 82. It should be mentioned that the transmitter of the present embodiment send signals by rf, other types of wireless signaling such as optical or acoustic may be employed.

Controller 83 responds to the various input signals by controlling the movement or stoppage of motor 106. Accordingly, micro-controller 84 sends motor control signals via a path 102 to relay control logic 104 which sends power to the motor, to drive the motor in one direction or the other or to stop the motor from movement. Head end 12 may also comprise a light 81 which may be controlled by the relay logic 104 in response to controller 83.

For security reasons the head end 12 should respond to signals from wireless transmitters e.g., 30, 31 and 34 only when those transmitters are authorized. For security purposes the signals from each transmitter include an access code which may be different for each transmitter. In one known arrangement the access code is twenty trinary digits in length, providing good security. The barrier movement operator of the present embodiment includes the ability to learn the access codes from various wireless transmitters by entering a learn mode and receiving a transmitted code. Head end 12 includes a learn switch 16 which is a push button switch connected to micro-controller 84. When learn switch is pressed micro-controller executes a pre-programmed sequence of instructions to learn the access code of a wireless transmitter e.g., 31 which is activated to transmit after the learn mode is entered. While in the learn mode receiver 80 receives the transmission from the sending transmitter and sends a representation to micro-controller 84 representing the received signal. Micro-controller 84 identifies the access code portion of the received signal and validates it. The code is then stored in non-volatile memory 88 and the learn mode is terminated. When not in the learn mode the barrier movement operator is in an operate mode during which received access codes are compared with the stored representations of learned access codes and when a proper relationship is present micro-controller 84 responds to the signal by controlling the door 24. In order to prevent the learning of unauthorized transmitter access codes controller 83 includes the ability to inhibit or prohibit learning new access codes.

Figure 3:
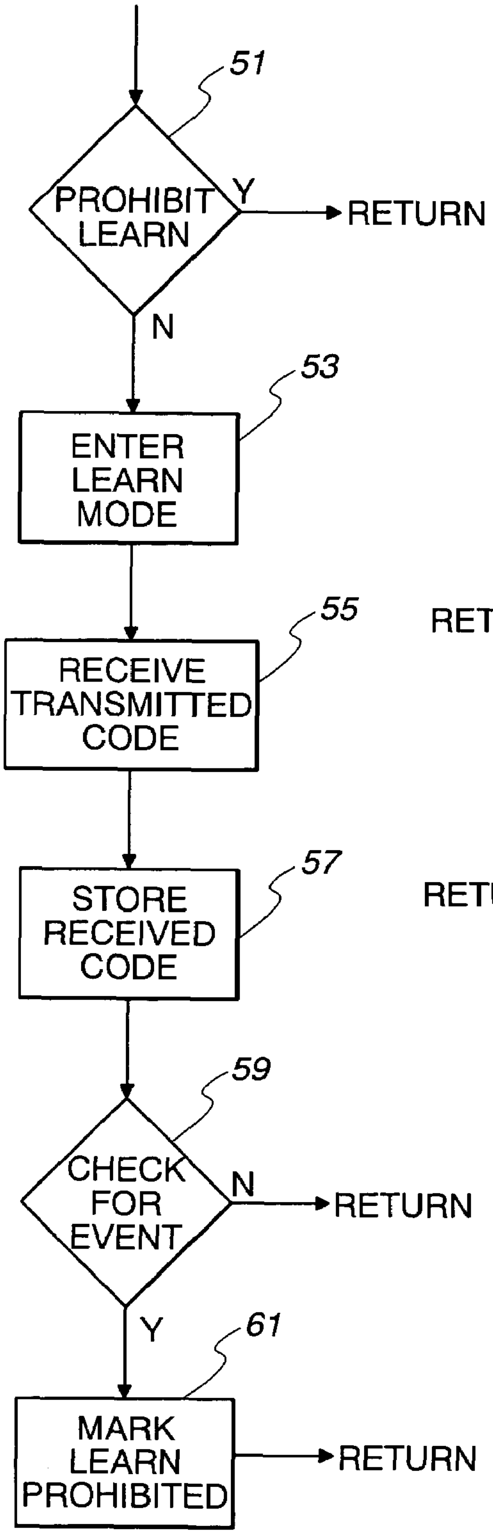
FIG. 3 is a flow diagram of a function performed to prohibit further access code learning.

FIG. 3 is a flow diagram of a learn process including learn prohibit activities. Initially, a learn request is received by the apparatus and analyzed in a step 51. When step 51 determines that prohibit learn is active the process returns without implementing any learning. Alternatively, when step 51 determines that prohibit learn is not active flow proceeds to block 53 where the learn mode is entered. After the beginning of the learn mode flow proceeds to block 55 where the transmitted code is received and on to block 57 where the access code portion of the received code is stored. A check is then performed in block 59 to determine whether the event which begins the learn prohibit mode has occurred. As discussed below, such an event may be the receipt of a specified signal or the storage of a predetermined number of access codes. When block 59 determines that the event has not occurred flow returns to await another learn mode activity. Alternatively, when block 59 determines that the event has occurred flow proceeds to block 61 where the prohibit learn is marked active and flow returns. When prohibit learn is marked active such will be detected on the next occurrence of block 51 and flow will return without learning a new access code.

Figure 4:
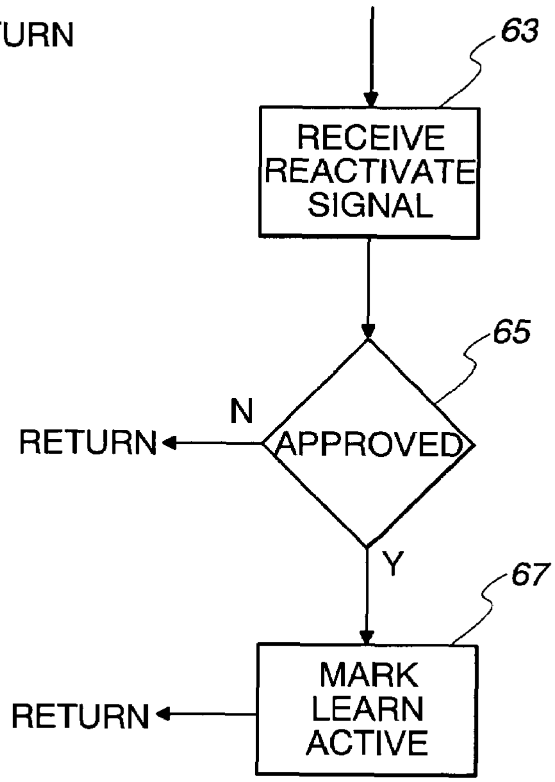
FIG. 4 is a flow diagram of a function to re-activate access code learning after it has been prohibited.

FIG. 4 is a flow diagram of the process used to disable the prohibit learn function so that further performances of block 51 (FIG. 3) will allow the learning of new access codes. Periodically, the flow checks in block 63 whether the system has-received a signal to re-activate the learn mode. Flow proceeds to a block 65 to determine whether the received signal is proper. If proper flow proceeds to a block 67 where learn process is again marked active and flow returns. Alternatively, when block 65 determines that the request to re-activate the learn process is not proper flow returns without marking learn active. The following embodiments illustrate the principles of the above flow diagrams.

In one embodiment the controller 83 is programmed to accept only a preset maximum number of access codes, for example 8. The installer of such an operator enters the learn mode for each transmitter he or she wants the operator to learn and completes the above-described learn mode sequence for each. Should the installer want to teach/learn fewer than the maximum number he or she will then teach/learn the access codes of already learned transmitters until the maximum number of access codes has been learned. Although some learned access codes will be redundant the maximum number of access codes will be learned. When the maximum has been learned the controller 83 will no longer respond to the learn button 26 by entering the learn mode which may be prevented by numerous methods. When in the learn prohibitions mode the micro-controller can determine at each press of the learn button 26 that learn prohibition is active and as a result the learn access code sequence of program is skipped. Alternatively, when the learn mode prohibition is active the entire sequence of program instructions could be changed to one in which the input from the learn switch is ignored and/or which does not include the program steps performed to implement learning. Further, while in the learn prohibition mode the learn switch could be ignored by hardware or software arrangements.

In the preceding embodiment the maximum number of access codes was preset without installer intervention. In another embodiment the installer may be given control of the maximum number. For such installer control it is necessary for the installer to accurately count the total number of transmitter access codes to be learned then enter the learn mode by pressing the learn button 26. The first time the learn mode is entered, the program allows the installer to set the maximum number of codes to be learned by repeatedly pressing the learn button 26 to represent the number of codes to be learned. The micro-controller 84 then records the maximum number and when the number of access codes learned equals the maximum number, the micro-controller 84 prohibits further learning of access codes. Optionally, the head end 12 may include a light such as an LED which the micro-controller blinks to represent the number of codes to be learned. It should be apparent that a numerical screen may be used to convey the number of access codes also.

A further embodiment allows the installer to limit the maximum number by turning on the prohibition against further learning after the access codes of all authorized transmitters have been learned. In this embodiment the head end includes an end learn switch 15 connected to micro-controller 84. An installer teaches access codes from transmitters as described above. When all transmitters to be authorized have been learned the installer presses the end learn mode button 15 in response to which the controller enters the prohibit learn mode. The controller can alternatively be pre-programmed to respond to a press of the end learn mode button 15 followed by the receipt of an access code from a previously learned transmitter to enter the prohibit learn mode. Similarly, the use of a predetermined button on a transmitter may optionally be used to enter the prohibit learn mode.

In the case of professionally installed barrier movement operators an alternative embodiment may be used. In the alternative embodiment the professional installer has a special master transmitter, the access code of which was previously stored in the controller at the time of manufacturer and which is not used by transmitters given to routine owners or users. When a controller 83 receives a transmission from the master transmitter the prohibit learn mode could be toggled on and off.

The barrier movement operation might optionally be provided with a key switch 17 which is shown in FIG. 1 as being mounted to the cover of the head end unit 12 although other secure placements of the key switch may be used. The key switch is a normal electrical switch the position of which is only changed by the use of a physical key. The key switch is then activated to enter and leave the prohibit learn mode. In an alternative embodiment the head end is not provided with a learn button 26 and the learn button function is replaced by the key switch 17. That is, the operator only learns an access code in a learn mode entered by activating the key switch 17.

The preceding description relates to the learn mode and how a prohibit learn mode can be activated. Further access codes cannot be learned after the prohibit learn mode is entered. Such may be too much limitation on the owner/user of the barrier movement operation. Accordingly, certain methods and apparatus may be implemented to stop the prohibit learn mode and allow the learning of access codes.

In one embodiment, when it is desired to have the operator learn one or more access codes after the prohibit learn mode is active, all previously learned access codes are erased and the learn mode is entered as before. Such a re-activation of a learn capability may be in response to a signal from a secure switch such as, key switch 17 or in response to a master transmitter held only by installers and sellers of the barrier movement operator. For added security these acts could be responded to only when accompanied by an access code from a previously learned transmitter. In embodiments for use where the maximum security is not needed the controller 83 is programmed to respond to a sequential press of the learn button 26 and the reception of a previously learned access code. The above re-activation of learn mode includes the erasure of all previously learned access codes and the subsequent re-learning of the access codes for authorized transmitters. In alternative embodiments the re-activation of the learn mode could be done without erasure. Such would then be dependant on the security of the re-activation process.

What is claimed is:

1. A method for teaching access codes in a security code system, the method comprising steps of:

generating by user interaction a first code learn mode signal with a first transmitter to operate a security system so that the user may gain access to a learn mode of the security system without the use of a deactivating source;

responding to the first learn mode signal generated by user interaction by initiating a code learn mode in which access codes are received and stored;

detecting a first code learn mode terminating event related to storage of the access codes by the access code system;

upon detection of the first code learn mode terminating event, operating the security code system in a secure mode wherein initiation of the code learn mode by user generation of the first code learn mode signal is prohibited;

detecting a deactivating event, the deactivating event generated by the deactivating source which deactivates the secure mode and allows initiation of the code learn mode by user generation of the first code learn mode signal, the deactivating source selected from the group consisting of a key which permits the generation of the deactivating event and a second transmitter which permits the generation of the deactivating event and permits the operation of the security code system in learn mode by user interaction.

2. The method in accordance with claim 1, wherein the step of detecting the first code learn mode terminating event comprises detecting a a learn mode limiting signal identifying that no further access codes are to be learned.

3. The method in accordance with claim 1, wherein the step of detecting the first code learn mode terminating event comprises detecting the storage of a predetermined number of access codes.

4. The method of claim 3 comprising setting the predetermined number of access codes.

5. The method of claim 4 wherein the setting step comprises pressing a learn switch one or more times to represent the predetermined number of access codes.

6. The method in accordance with claim 2 wherein the learn mode limiting signal is generated in response to a user generated signal.

7. The method in accordance with claim 6 wherein the user generated signal is generated by user interaction with a access code transmitter.

8. The method in accordance with claim 6 wherein the learn mode limiting signal is generated by user interaction with a secure switch, access to which is limited.

9. The method in accordance with claim 6 wherein the learn mode limiting signal is generated by a lock protected switch.

10. The method in accordance with claim 1, wherein the deactivating source re-enables the code learn mode after the prohibition of the learn mode.

11. The method in accordance with claim 10 wherein the re-enabling step is performed in response to a re-enabling signal from the second transmitter.

12. The method in accordance with claim 10 wherein the re-enabling step is performed in response to a re-enabling signal as a result of the re-enabling signal being released by the key.

13. A method for preventing unauthorized learning of security codes by a security code receiver, comprising steps of:

activating code learn mode of the receiver with a first learn mode signal without the use of a deactivating source;

storing a predetermined number of valid security codes in the receiver; and blocking the code learn mode of the receiver wherein initiation of the code learn mode by user generation of the first learn mode signal is prohibited without the use of the deactivating source; and detecting a learn mode access event event, the learn mode access event generated by the deactivating source having an enhanced security configuration, and allowing initiation of the code learn mode by user generation of the first code learn mode signal, the deactivating source selected from the group consisting of a key which permits the generation of the learn mode access event and a second transmitter which permits the generation of the learn mode access event and permit the operation of the code learn mode of the security code receiver by the user.

14. A method of protecting a barrier movement operator from unauthorized learning of access codes, comprising steps of:

activating learn mode for the operator;

receiving and storing access codes from a predetermined number of transmitters in a memory of the operator without an activation of the learn mode from an enhanced security deactivation device;

blocking the learn mode of the operator after receiving and storing access codes from the predetermined number of transmitters; and re-activation of the learn mode by an enhanced security deactivation device after the blocking, the enhanced security deactivation device selected from the group consisting of a key which permits reentry into the learn mode and a second transmitter, the reactivation permitting reentry into the learn mode and permitting the operation of the learn mode of the operator by the user.

15. The method according to claim 14, wherein the predetermined number of transmitters is set in the operator by pressing a learn button of the operator a representative number of times.

16. The method according to claim 15, comprising activating the learn mode of the operator for a learn mode term and indicating, during the learn mode term, a number of transmitters to be learned.

17. The method according to claim 14, wherein the learn mode is re-activated by pressing a learn button of the operator and receiving a unique signal from the second transmitter previously learned by the operator.

18. The method according to claim 14, wherein the learn mode is re-activated comprises receiving a learn mode signal from a master transmitter.

19. The method according to claim 14, wherein the learn mode is activated for a limited time.

20. The method according to claim 14, wherein the re-activation of learn mode of the operator comprises erasing all previously stored transmitter access codes from the memory of the operator.

21. The method in accordance with claim 14, wherein blocking of the learn mode of the operator comprises activating a block switch.

22. The method according to claim 14, wherein the learn mode is blocked when all the locations of the access code memory store access codes.

23. A barrier movement operator system, comprising:

a receiver with an access code memory for receiving, learning and responding to transmitted access codes;

an activation device for enabling a learn mode of the receiver without the use of a deblocking apparatus;

at least one wireless transmitter having an access code to be trained into the access code memory of the receiver by a first code learn mode signal in order to operate the system in a learn mode of the receiver;

a controller for operating during the learn mode of the receiver and evaluating availability of the access code memory for storing new access codes;

apparatus for making learn mode inactive, a blocking apparatus which blocks the learn mode of the receiver to prevent unauthorized activation of the learn mode by the first code learn mode signal and prevents re-entry into learn mode with enhanced security, the de-blocking apparatus permiting re-entry into the learn mode by the first code learn mode signal, the de-blocking apparatus including an enhanced security device selected from the group consisting of a key and a second transmitter.

24. The operator system in accordance with claim 23, further comprising an indicator for showing a number of access codes to be learned during a learn mode term.

25. The operator system according to claim 23, wherein the deblocking apparatus includes the key.

26. The operator system according to claim 23, wherein the deblocking apparatus comprises the second transmitter.

27. The operator system according to claim 23, comprising a plurality of additional transmitters each having an access code, wherein the access code memory of the receiver has a predetermined number of access code locations, and during the learn mode stores the access codes from the transmitters and their copies in the locations until all the access code locations are full.

28. The operator system according to claim 27, wherein, prior to storing a new access code, the controller evaluates the memory looking for a copy of a stored access code, and overwrites the copy with the new access code.

29. The operator system according to claim 26, wherein the second transmitter is kept by a seller of the operator system.

30. A barrier movement operator for moving a barrier comprising a motor apparatus connecting the motor to the barrier for movement thereof;

a controller, responsive to access codes from a transmitter, for controlling the motor to move and stop the barrier, the controller comprising a learn capability in a learn mode which is entered upon user generation of a first code learn signal and during the learn mode access codes from one or more transmitters can be learned without access to a learn mode through an enhanced security learn mode control apparatus; and the enhanced security learn control apparatus responsive to a detection of a code learn capability terminating event for operating the operator in a secure mode wherein initiation of the code learn capability by user interaction is prohibited on the occurrence of a first learn mode deactivation event which thereafter protects the learn mode with an enhanced security secure learn mode, the enhanced security learn control apparatus effective for detecting a second event, the second event generated by a source having an enhanced security configuration, and the second event responsively deactivating the enhanced security secure mode and allowing initiation of the learn capability by user generation of the first code learn mode signal, the source including a key which permits the generation of the second event or a second transmitter which permits the generation of the second event and permit the operation of the operator in learn mode by the user.

31. A barrier movement operator according to claim 30 wherein the source includes the key.

32. A barrier movement operator according to claim 30 wherein the source comprises the second transmitter.

33. A barrier movement operator according to claim 30 wherein the learn control apparatus comprises a counter for counting a number of access codes learned by the controller.

* * * * *

UNITED STATES PATENT AND TRADEMARK OFFICE

CERTIFICATE OF CORRECTION

PATENT NO. : 7,429,910 B2 
APPLICATION NO. : 10/379875
DATED : September 30, 2008
INVENTOR(S) : Meryldine Domenz and James J. Fitzgibbon It is certified that error appears in the above-identified patent and that said Letters Patent is hereby corrected as shown below:

Claim 2, Column 6, Line 9; Delete “a” (second occurrence);

Claim 13, Column 6, Line 32; Delete “event” (second occurrence);

Claim 23, Column 7, Line 52; Change “inactive,” to -- inactive; --;

Claim 23, Column 7, Line 57; Change “permiting” to -- permitting --; and

Claim 30, Column 8, Line 23; After “comprising” insert a colon -- : --.

Signed and Sealed this

Thirteenth Day of January, 2009

JON W. DUDAS
*Director of the United States Patent and Trademark Office*